US009730855B2

(12) United States Patent
Wang et al.

(10) Patent No.: US 9,730,855 B2
(45) Date of Patent: Aug. 15, 2017

(54) COLLAPSIBLE PERSONAL WHEELED CONVEYANCE HAVING A SELECTIVELY ADJUSTABLE WIDTH

(71) Applicant: Medline Industries, Inc., Northfield, IL (US)

(72) Inventors: Zhiliang Wang, Zhongshan (CN); Margaret M. Andersen, Chicago, IL (US); Frank Martorelli, Chicago, IL (US)

(73) Assignee: Medline Industries, Inc., Northfield, IL (US)

( * ) Notice: Subject to any disclaimer, the term of this patent is extended or adjusted under 35 U.S.C. 154(b) by 0 days.

(21) Appl. No.: 14/929,810

(22) Filed: Nov. 2, 2015

(65) Prior Publication Data

US 2017/0119616 A1 May 4, 2017

(51) Int. Cl.
*B60B 1/00* (2006.01)
*A61H 3/04* (2006.01)

(52) U.S. Cl.
CPC ...................................... *A61H 3/04* (2013.01)

(58) Field of Classification Search
CPC ................ A61H 3/04; B62B 7/06; B62B 7/08
See application file for complete search history.

(56) References Cited

U.S. PATENT DOCUMENTS 2,556,121 A * 6/1951 Thomas ................... A61G 5/10 280/304.1
8,708,363 B1 * 4/2014 Chang ...................... A61H 3/04 135/67

(Continued)

FOREIGN PATENT DOCUMENTS

CN 201505237 U 6/2010
CN 104244784 A 12/2014
JP 2003334215 A 11/2003

(Continued)

OTHER PUBLICATIONS

International Search Report and Written Opinion for PCT/US2016/059053 dated Jan. 31, 2017; 12 pages.

*Primary Examiner* — John Walters
*Assistant Examiner* — James Triggs
(74) *Attorney, Agent, or Firm* — Fitch, Even, Tabin & Flannery LLP

(57) ABSTRACT

A collapsible personal wheeled conveyance comprises a first and second collapsible side frame, each having ground-contacting wheels, and at least one adjustable crossbar configured to physically connect the two collapsible side frames, the adjustable crossbar(s) having a selectively adjustable length. The adjustable crossbar(s) may be lockable or non-lockable. One or more of the adjustable crossbars may comprise seat-supporting adjustable crossbars. A seat can be configured to move laterally along such a seat-supporting adjustable crossbar to permit selective adjustment of the lateral position of this seat with respect to the side frames. One or more locking mechanisms can serve to lock the seat at a particular position. By one approach the aforementioned seat-supporting adjustable crossbar can include spacing indicia to visually indicate when the seat is centrally located between the first and second collapsible side frames for a particular selected length of the seat-supporting adjustable crossbars.

12 Claims, 7 Drawing Sheets

(56) References Cited

U.S. PATENT DOCUMENTS

| | | | | |
|---|---|---|---|---|
| 9,358,175 | B2 * | 6/2016 | Bordan .................... | A61H 3/00 |
| 2007/0107761 | A1 | 5/2007 | Kovachi | |

FOREIGN PATENT DOCUMENTS

| | | | |
|---|---|---|---|
| JP | 2004159950 | A | 6/2004 |
| KR | 1020080101182 | A | 11/2008 |
| WO | 0124759 | A1 | 4/2001 |

* cited by examiner

COLLAPSIBLE PERSONAL WHEELED CONVEYANCE HAVING A SELECTIVELY ADJUSTABLE WIDTH

TECHNICAL FIELD

These teachings relate generally to personal wheeled conveyances including wheelchairs and rollators.

BACKGROUND

Personal wheeled conveyances such as wheelchairs are typically designed to transport a sitting person and so-called companion chairs are a lighter-duty mechanism having a similar operating purpose. Accordingly, both wheelchairs and companion chairs typically have leg riggings to support the transportee's lower appendages above the ground. Rollators are a walking aid and hence lack such leg riggings. That said, some rollators include a seat. This seat provides the user with a place to sit when that need arises (for example, when the user needs a break from standing or walking).

The basic design for a rollator is well established; a frame having four ground-contacting wheels and a pair of handles that the user can grip when walking with the aid of the rollator. Unfortunately, these deceptively simple design concepts are not always implemented in a fashion that well suits the needs of the complete user population. Persons who seek walking assistance can also present a variety of other conditions and/or preferences that can, in practice, interfere with their successful use of the rollator. Examples include, but are not limited to, persons of considerable girth and persons wearing one or more therapeutic or otherwise protective mechanisms such as casts, braces, and so forth.

BRIEF DESCRIPTION OF THE DRAWINGS

The above needs are at least partially met through provision of a collapsible personal wheeled conveyance having a selectively adjustable width described in the following detailed description, particularly when studied in conjunction with the drawings, wherein.

Figure 1:
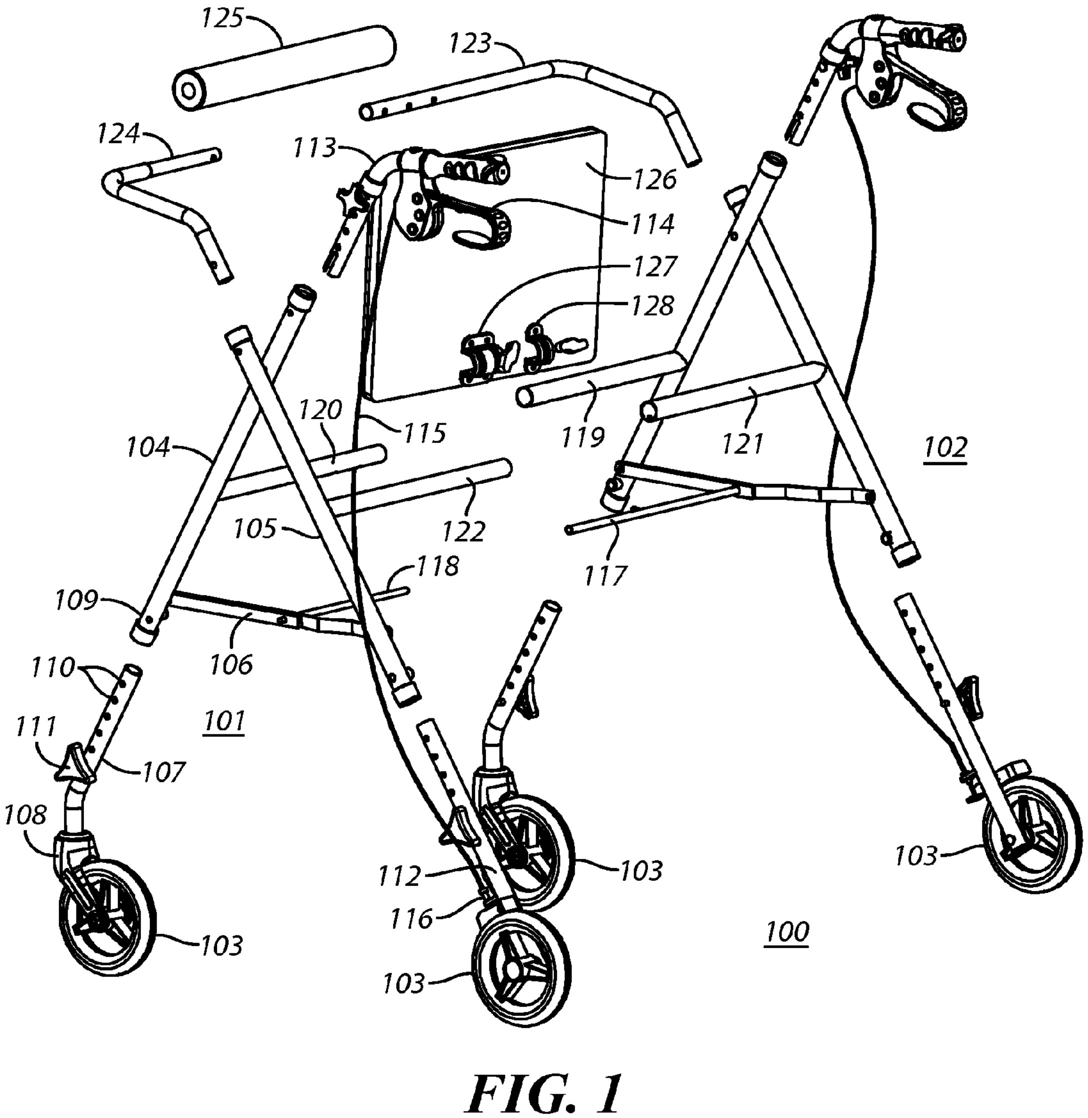
FIG. 1 comprises an exploded rear perspective view as configured in accordance with various embodiments of these teachings.
Figure 2:
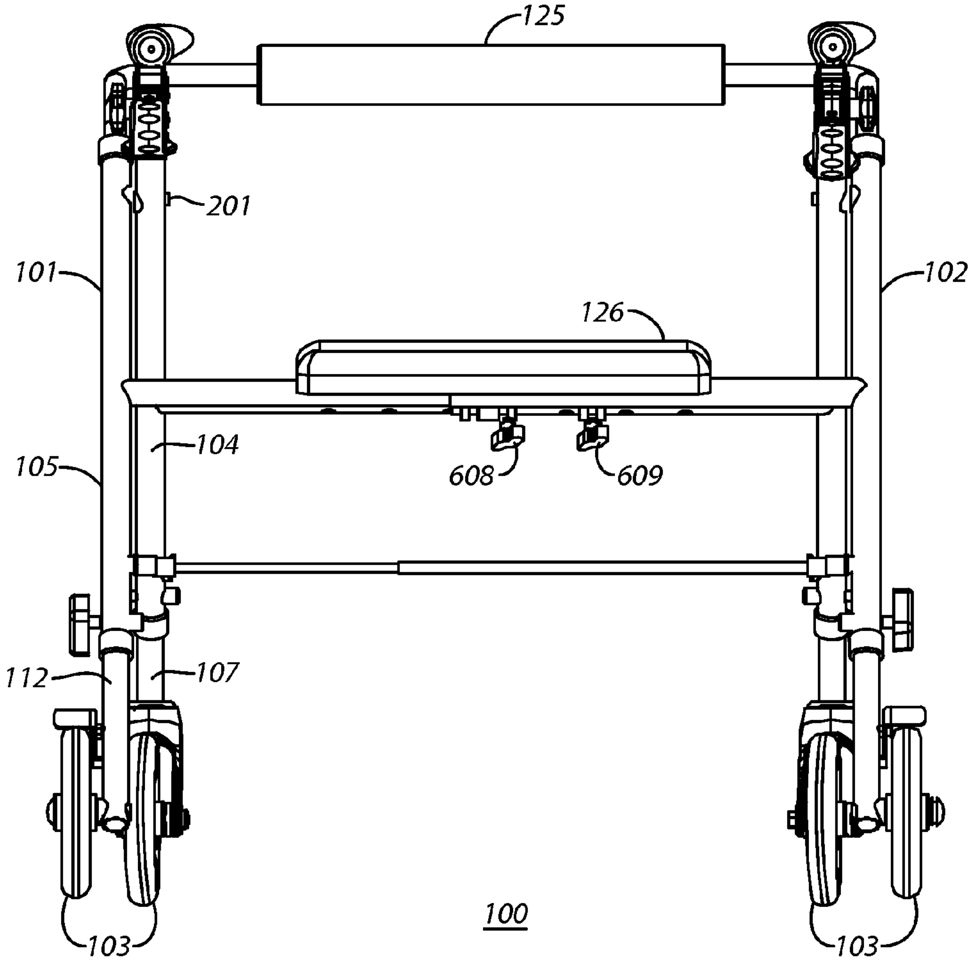
FIG. 2 comprises a rear elevational view as configured in accordance with various embodiments of these teachings.
Figure 3:
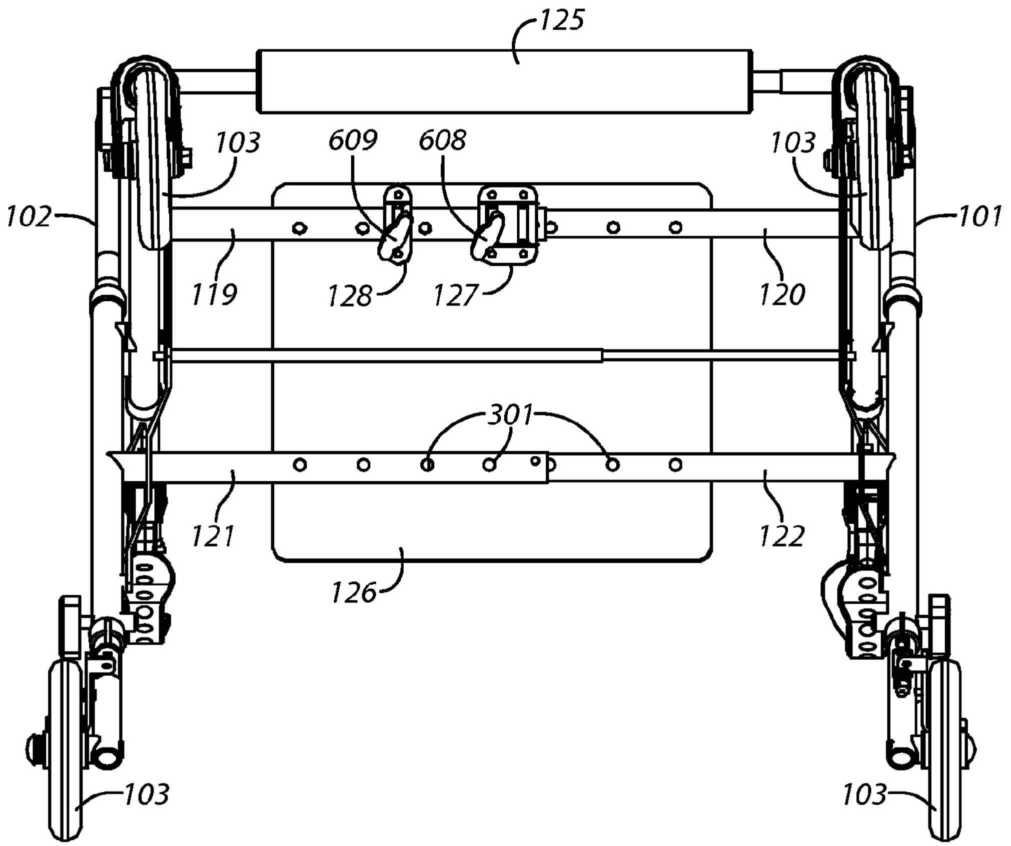
FIG. 3 comprises a bottom plan view as configured in accordance with various embodiments of these teachings.
Figure 4:
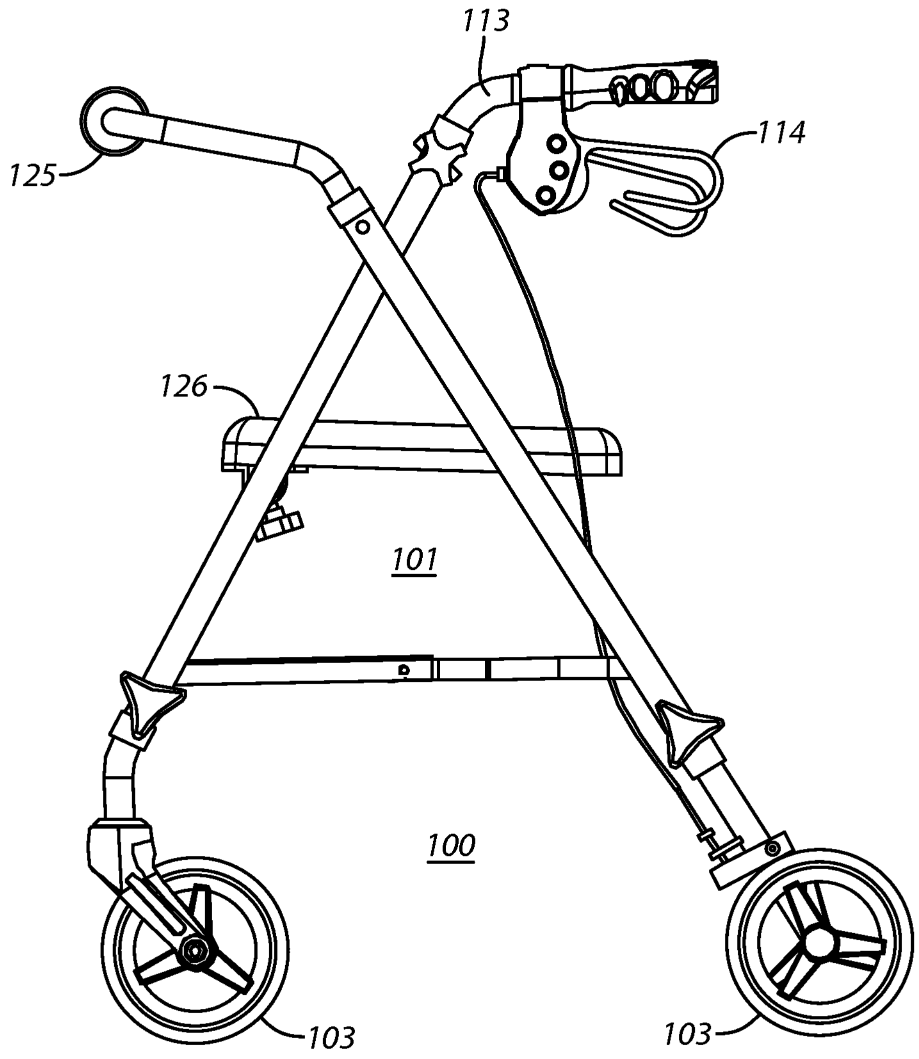
FIG. 4 comprises a side elevational view as configured in accordance with various embodiments of these teachings.
Figure 5:
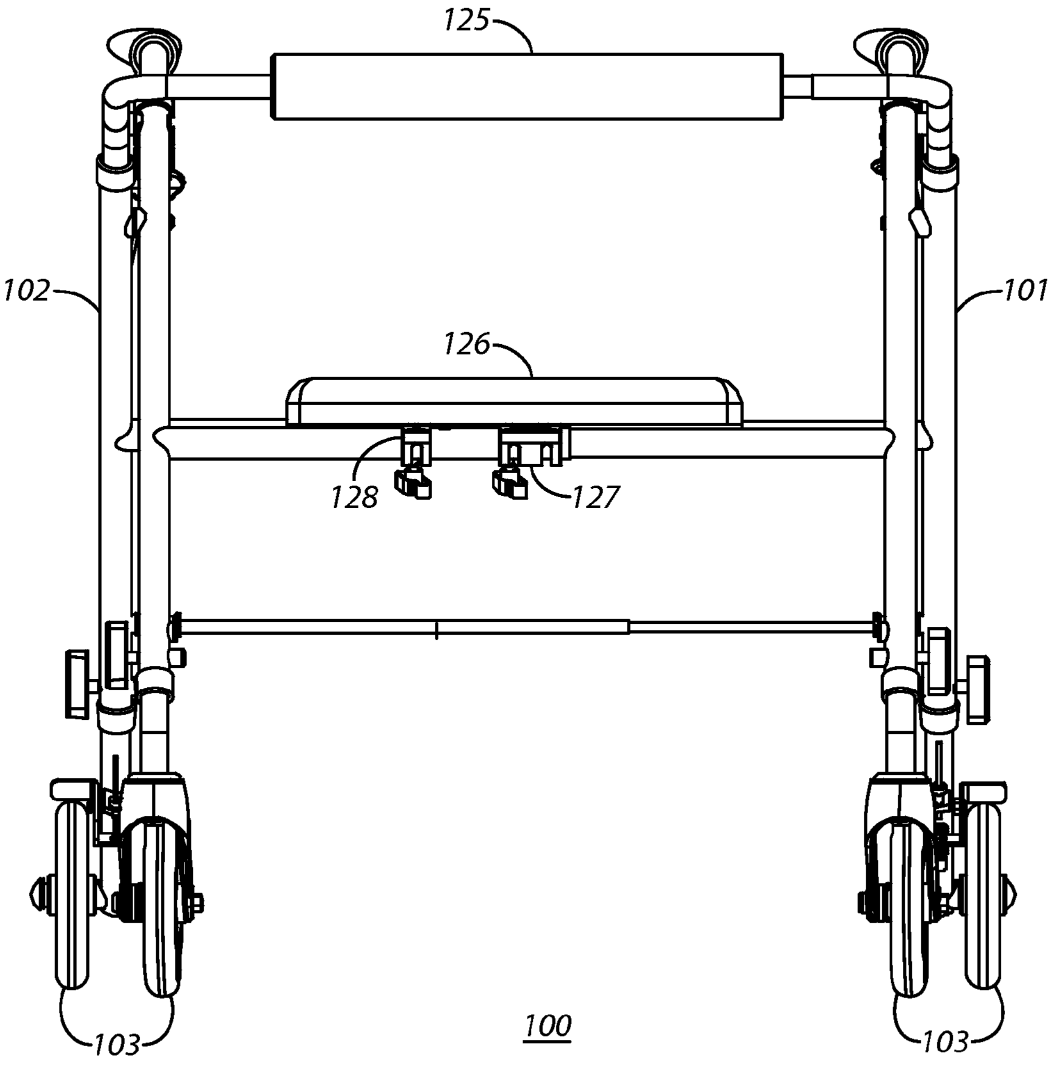
FIG. 5 comprises a front elevational view as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, pursuant to these various embodiments, a collapsible personal wheeled conveyance comprises a collapsible first and second side frame, each having ground-contacting wheels, and at least one adjustable crossbar configured to physically connect the collapsible first side frame to the collapsible second side frame, the adjustable crossbar having a selectively adjustable length to thereby adjust a width between the collapsible first side frame and the collapsible second side frame. By one approach the personal wheeled conveyance includes a plurality of such adjustable crossbars. If desired, the adjustable crossbars may be lockable or non-lockable as desired. By one approach two of the adjustable crossbars comprise seat-supporting adjustable crossbars.

By one approach a seat for the personal wheeled conveyance is configured to move laterally along the seat-supporting adjustable crossbars to thereby permit selective adjustment of the lateral position of this seat with respect to the first and second collapsible side frames. This can comprise, by one approach, maintaining the seat at a substantially central position between the two side frames regardless of a presently selected width of the personal wheeled conveyance.

If desired, one or more locking mechanisms can serve to lock the seat at a particular position. By one approach the locking mechanism simultaneously locks both the position of the seat with respect to a seat-supporting adjustable crossbar and a selected length of the seat-supporting adjustable crossbar.

By one approach the aforementioned seat-supporting adjustable crossbar can include spacing indicia to visually indicate when the seat is centrally located between the first and second collapsible side frames for a particular selected length of the seat-supporting adjustable crossbars. By one approach the spacing indicia can include alignment lines. By another approach, in lieu of the foregoing or in combination therewith, the spacing indicia can comprise, for example, differently-colored geometric shapes and/or different alphanumeric characters.

So configured, the width of a collapsible personal wheeled conveyance such as a rollator can be selectively adjusted as desired to present a narrower or wider seating and standing/walking area. The collapsible personal wheeled conveyance remains structurally sound notwithstanding such flexibility. Perhaps just as important, adjusting the collapsible personal wheeled conveyance to a desired width and even properly positioning the seat can be accomplished with relative ease and in a highly intuitive manner.

These and other benefits may become clearer upon making a thorough review and study of the following detailed description. Referring now to the drawings, and in particular to FIGS. 1-5, a personal wheeled conveyance 100 comprises generally a collapsible first side frame 101 and a collapsible second side frame 102. Both of these side frames 101 and 102 are positioned laterally opposite one another and are essentially mirror images of one another.

Also generally speaking, both the collapsible first side frame 101 and the collapsible second side frame 102 include ground-contacting wheels 103. In particular, and as illustrated, the collapsible first side frame 101 includes two ground-contacting wheels 103 as does the collapsible second side frame 102.

As the two side frames 101 and 102 are essentially identical (albeit mirror images of one another), only the collapsible first side frame 101 will be described here in detail.

The collapsible first side frame includes a pair of pivotally connected tubes 104 and 105. A pivot pin 201 (as perhaps best illustrated in FIG. 2) pivotally connects one such tube 104 to the other 105. A collapsible brace 106 pivotally connects at each of its ends to one of the tubes 104 and 105, respectively. So configured, the collapsible brace 106 can pivot and collapse inwardly as the two tubes 104 and 105 pivot towards one another. This facility permits the resultant personal wheeled conveyance 100 to be at least partially collapsed for ease of transport and storage. (As used herein it will be understood that the words "collapse" and "collapsible" refer to a designed-in ability to selectively collapse in a non-destructive and easily reversible manner and therefore do not include components that can be destructively collapsed towards one another by application of a force that overcomes the strength of rigidly-static elements that are designed and intended to hold the components in a non-compressed state.)

Being tubes, these tubes 104 and 105 are at least partially hollow and will therefore accommodate receiving another tube having a smaller external diameter therein. So configured, and as described now in more detail, this permits various legs and handles to be connected and secured to these tubes 104 and 105. In this illustrative example these tubes have a cylindrically-shaped cross-section. These teachings will accommodate other approaches in these regards, however. For example, these tubes may have an elliptical cross-section, a rectangular cross-section, a square cross-section, a hexagonal cross-section, an octagonal cross-section, or essentially any cross-sectional form factor of choice.

The first aforementioned tube 104 comprises a front-facing portion of the collapsible first side frame 101. A front leg 107 is configured to slide into the aforementioned tube 104. At its opposing end the front leg 107 includes a fork 108 configured to receive and rotatably contain a ground-contacting wheel 103.

In this illustrative example the lower end of this tube 104 includes a threaded hole 109 that extends into the tube 104. The front leg 107, in turn, includes a plurality of holes 110 formed through opposing sides of the front leg 107. So configured, the front leg 107 can be disposed within the lower end of the side frame tube 104 to a desired depth and such that the hole 109 in the tube 104 aligns with one of the holes 110 in the front leg 107.

A threaded lock member 111 can then be threadably engaged with the aligned holes 109 and 110 to thereby secure the front leg 107 in place in the tube 104. The threaded lock member 111 can comprise, for example, a threaded shaft having a hand-graspable knob disposed at one end thereof to facilitate so placing and threadably engaging the aforementioned components.

Somewhat similarly, a rear leg 112 having an axle to receive one of the ground-contacting wheels 103 can be received within the second tube 105 that comprises part of the collapsible first side frame 101 such that another threaded lock member can be utilized to lock the rear leg 112 in place with respect to the second tube 105. Generally speaking, the extent to which the front leg 107 and back leg 112 are received within or extend outwardly of their respective tubes 104 and 105 will help dictate the overall height of the personal wheeled conveyance 100. Accordingly, the height of this apparatus can be selectively adjusted to suit users of various heights.

The front side frame tube 104 is similarly configured to receive a handle component 113 in its upper end. This handle component 113 and the upper end of the front side frame tube 104 include threaded holes to again receive a threaded lock member as described above to permit the handle component 113 to be disposed by the user at a particular height and secured at that position.

In this illustrative example the handle component includes a hand grip and a brake handle assembly 114. The brake handle assembly 114 includes a pivoting lever that connects via a cable 115 to a brake 116 that is disposed and configured to interact with the ground-contacting wheel 103 disposed on the back leg 112. Such braking mechanisms are well understood in the art and require no further elaboration here.

The back side frame tube 105 is also configured to receive a back rest component. In this case, as illustrated, the back rest component 124 slides into the upper end of the back side frame tube 105 and is secured at only one available position. That securement can be achieved, for example, by aligning a spring-biased button in the back rest component 124 with a corresponding hole through the side wall of the back side frame tube 105 such that the spring-biased button extends at least partially into the hole. It will be appreciated that any number of other securement mechanisms can be employed in these regards. These teachings will also accommodate using a threaded lock member as described above if desired.

In this illustrative example the back rest component 124 further secures to and cooperates with another back rest component 123 that is similarly attached to the collapsible second side frame 102 to thereby form a lateral back rest. The first back rest component 124 can be secured to the second back rest component 123 using, again, any of a variety of locking modalities such as the aforementioned spring-biased button. In this case, however, one of the back rest components (in this case, the second bask rest component 123) includes a plurality of spaced holes to receive the spring-biased button to thereby permit the user to select any of a variety of lengths for the resultant lateral back rest.

A soft tube (comprised of, for example, any of a variety of leather, cloth, and/or soft plastic materials) 125 can be disposed about the lateral back rest if desired.

So configured, the aforementioned resultant lateral back rest comprises one of four adjustable crossbars that each has a selectively adjustable length to thereby permit adjusting the width between the collapsible first side frame 101 and the collapsible second side frame 102. In this example this particular adjustable crossbar comprises a lockable adjustable crossbar as described above.

In this illustrative example another of the adjustable crossbars comprises a tube 117 that secures to the collapsible brace 106 (and extends outwardly therefrom at a perpendicular angle) on the collapsible second side frame 102 and that receives therein a rod or tube 118 that similarly secures to the collapsible brace 106 on the collapsible first side frame 101. This particular adjustable crossbar can comprise a non-lockable adjustable crossbar if desired or, if desired, a set screw or other locking mechanism can be utilized to secure both of these components to one another.

In this illustrative embodiment the collapsible personal wheeled conveyance 100 includes two additional adjustable crossbars that comprise, in this example, seat-supporting adjustable crossbars. In this example these seat-supporting adjustable crossbars comprise tubes, with the tubes 119 and 121 that are secured to the collapsible second side frame having an interior cross section that is somewhat larger than the exterior cross-section of the tubes 120 and 122 that are secured to the collapsible first side frame 101. In addition, it will be noted that both tubes 104 and 105 for both side frames 101 and 102 have such a seat-supporting adjustable crossbar component. So configured, the seat-supporting adjustable crossbar tubes 120 and 122 of the collapsible first side frame 101 can be fit inside the seat-supporting adjustable crossbar tubes 119 and 121 of the collapsible second side frame 102 when the two side frames 101 and 102 are moved towards one another to assemble the collapsible personal wheeled conveyance 100.

Figure 6:
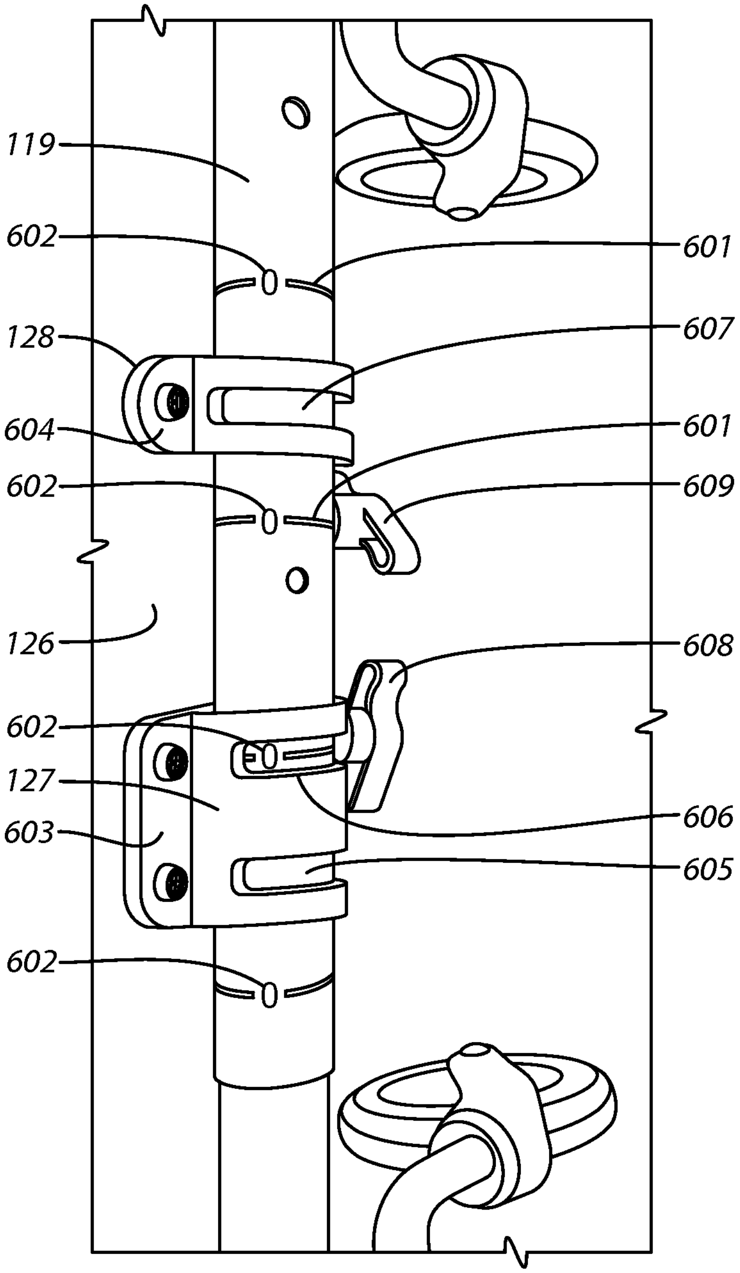
FIG. 6 comprises a detail view as configured in accordance with various embodiments of these teachings FIG. 7 comprises a front elevational view as configured in accordance with various embodiments of these teachings.

In this illustrative example a seat 126 has two mounting brackets 127 and 128 affixed to the underside thereof. Referring momentarily to FIG. 6, the first such bracket 127 has flanges 603 on opposing sides thereof with holes disposed therethrough to receive attachment members such as screws to facilitate affixing the bracket 127 to the seat 126. The second bracket 128 includes similar flanges 604 to serve the same purpose.

The first bracket 127 is wider than the second bracket 128 and includes two slots 605 and 606 formed therethrough whereas the second bracket 128 has only a single such slot 607. These brackets and slots are spaced apart from one another such that at least one threaded hole 301 (these being holes formed through the aforementioned seat-supporting adjustable crossbar tubes 119-122 as well illustrated in FIG. 3) of the front seat-supporting adjustable crossbar will align with one of the slots when the seat 126 is substantially centrally located between the two side frames 101 and 102 regardless of how narrow or how wide the user adjusts the lengths of the above-described adjustable crossbars.

Threaded lock members 608 and 609 can then be utilized to both secure one of the front seat-supporting adjustable crossbar tubes to another such tube and to secure the seat 126 to the front seat-supporting adjustable crossbar. Notwithstanding this state of securement, it will be understood that the seat 126 can also pivot with respect to the front seat-supporting adjustable crossbar. That pivoting of the seat 126 can further contribute to a reduced profile when collapsing the personal wheeled conveyance 101.

If desired, and as also illustrated in FIG. 6, one or both of the front seat-supporting adjustable crossbar tubes 119 and 120 can include spacing indicia to provide visual cues regarding the location of the seat 126 with respect to the front seat-supporting adjustable crossbar and/or the first and collapsible second side frames 101 and 102. In this illustrative example the spacing indicia includes a line 601 that circumscribes the corresponding tube and that intersects a corresponding one of the aforementioned threaded holes 301. So configured, these lines 601 provide an easy way for a user to know where the threaded holes 301 are located even when not viewing such holes 301 directly.

In this illustrative example the spacing indicia also includes markers 602 formed, for the sake of an illustrative example, as circles. It will be understood that other shapes, both regular and irregular, could serve in the same regards if desired. These markers 602 are aligned substantially collinearly with one another and in parallel with the axis of the corresponding tubes. By one approach, although these markers may share a same geometric shape, these markers 602 may nevertheless be otherwise visually distinguished one from the others. This can comprise, for example, using a different color for each marker 602. Those colors, in turn, can correspond to a key code by which the user can readily determine which markers 602 should be contained within, for example, a given one of the seat bracket slots to thereby centrally locate and position the seat 126 for a given width setting.

These teachings are highly flexible in practice and will accommodate other approaches in these regards. As one example, instead of (or in combination with) the aforementioned geometric shapes, the markers 602 can each comprise a different alphanumeric character or value to again serve the same purposes as are described above.

Figure 7:
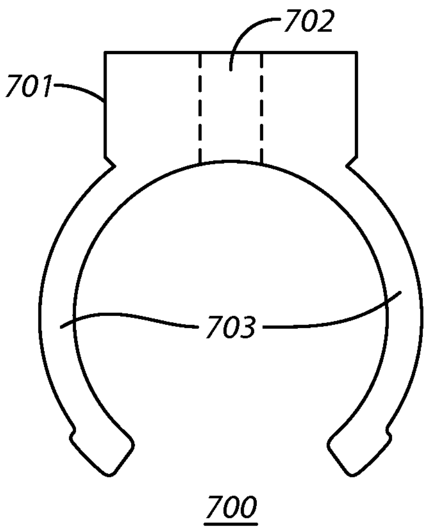
Figure 8:
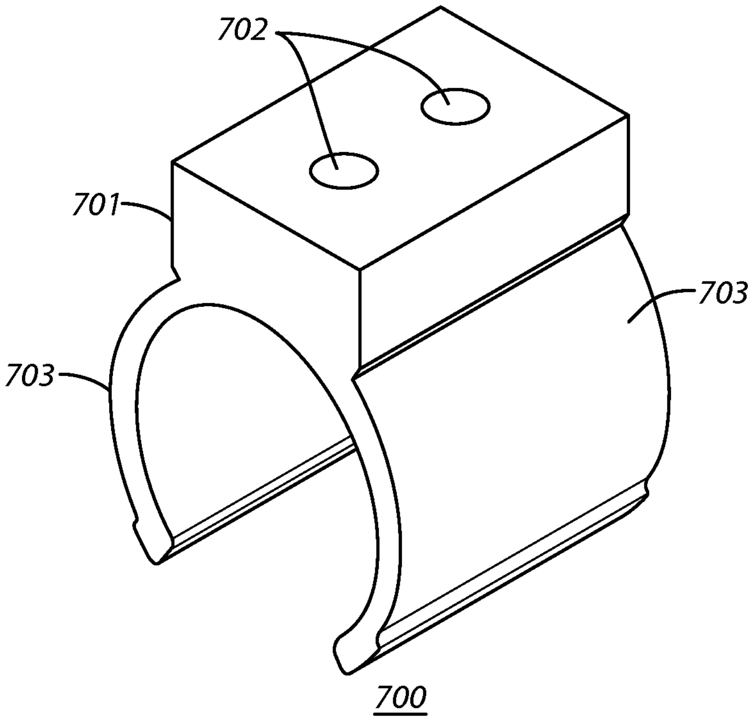
FIG. 8 comprises a perspective view as configured in accordance with various embodiments of these teachings.

As another example in these regards, instead of employing the aforementioned brackets to secure the seat 126 to one of the seat-supporting adjustable crossbar tubes, C-shaped spring-biased clamps 700 as shown in FIGS. 7 and 8 can serve in these regards. In this example the clamp 700 includes a base 701 having one or more holes 702 formed therethrough to permit securing the clamp 700 to the underside of the seat 126 (using, for example, a threaded member such as a screw). The clamp 700 can comprise clamping members 703 comprised of a resilient though at least somewhat flexible material to permit the clamping members 703 to be disposed about and then snugly squeeze the aforementioned seat-supporting adjustable crossbar to the aforementioned seat-supporting adjustable crossbar tube (or tubes if desired). By placing one or more of these clamps 700 on the underside of the seat 126 the seat 126 can be removably, slidably, and pivotally connected to at least one of the seat-supporting adjustable crossbar tubes.

So configured, a collapsible personal wheeled conveyance 100 having a well-recognized and familiar form factor (including handgrips, hand-operated brakes, and a seat) and various desirable capabilities (including an ability to collapse, adjust its height, and pivot the seat) is also readily able to assume a narrower or wider width as between two collapsible wheel-bearing side frames as desired. Accordingly, this collapsible personal wheeled conveyance 100 is able to more comfortably and appropriately accommodate a greater variety of differently-sized persons and/or a variety of prosthetic and/or therapeutic artifacts than those skilled in the art would typically expect for such an apparatus.

To a very large extent these teachings can be consummated using typical materials and fabrication techniques as are ordinarily associated with personal wheeled conveyances. These teachings can also be realized in an economically-reasonable manner.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:

1. A collapsible personal wheeled conveyance comprising:

a collapsible first side frame including ground-contacting wheels;

a collapsible second side frame including ground-contacting wheels;

at least one adjustable crossbar configured to physically connect the collapsible first side frame to the collapsible second side frame, wherein the adjustable crossbar has a selectively adjustable length to thereby adjust a width between the collapsible first side frame and the collapsible second side frame and wherein the at least one adjustable crossbar comprises at least two seat-supporting adjustable crossbars;

a seat configured to pivotally connect to one of the seat-supporting adjustable crossbars, wherein the seat is further configured to move laterally along the seat-supporting adjustable crossbars to thereby selectively adjust a lateral position of the seat with respect to the first and collapsible second side frames.

2. The collapsible personal wheeled conveyance of claim 1 further comprising a locking mechanism configured to simultaneously lock a selected length of at least one of the seat-supporting adjustable crossbars and lock a position of the seat with respect to the at least one of the seat-supporting adjustable crossbars.

3. The collapsible personal wheeled conveyance of claim 2 wherein the seat is configured to pivot even when locked in position with respect to the at least one of the seat-supporting adjustable crossbars.

4. The collapsible personal wheeled conveyance of claim 1 wherein at least one of the seat-supporting adjustable crossbars includes spacing indicia to visually indicate when the seat is centrally located between the first and collapsible second side frames for a particular selected length of the seat-supporting adjustable crossbars.

5. A collapsible personal wheeled conveyance comprising:

a collapsible first side frame including ground-contacting wheels;

a collapsible second side frame including ground-contacting wheels;

at least four adjustable crossbars configured to physically connect the collapsible first side frame to the collapsible second side frame, wherein the adjustable crossbars have a selectively adjustable length to thereby adjust a width between the collapsible first side frame and the collapsible second side frame and wherein at least one of the adjustable crossbars comprises a non-lockable adjustable crossbar and at least one of the adjustable crossbars comprises a lockable adjustable crossbar;

wherein two of the at least four adjustable crossbars comprise seat-supporting adjustable crossbars that further comprise lockable adjustable crossbars that are configured to lock at a selected length using at least two different locking modalities.

6. The collapsible personal wheeled conveyance of claim 5 wherein one of the adjustable crossbars comprises a handle for the collapsible personal wheeled conveyance.

7. The collapsible personal wheeled conveyance of claim 6 wherein the adjustable crossbar that comprises the handle further comprises a lockable adjustable crossbar.

8. The collapsible personal wheeled conveyance of claim 1 wherein the at least one adjustable crossbar comprises a plurality of adjustable crossbars.

9. The collapsible personal wheeled conveyance of claim 8 wherein at least one of the plurality of adjustable crossbars comprises a non-lockable adjustable crossbar.

10. The collapsible personal wheeled conveyance of claim 9 wherein at least one of the plurality of adjustable crossbars comprises a lockable adjustable crossbar.

11. The collapsible personal wheeled conveyance of claim 1 wherein the two seat-supporting adjustable crossbars are configured to be locked at a selected length by at least one locking modality.

12. The collapsible personal wheeled conveyance of claim 11 wherein the two seat-supporting adjustable crossbars are configured to be locked at the selected length by at least two different locking modalities.

* * * * *